April 11, 1967   J. F. BURR   3,313,524
REELING DEVICE
Filed Feb. 23, 1966
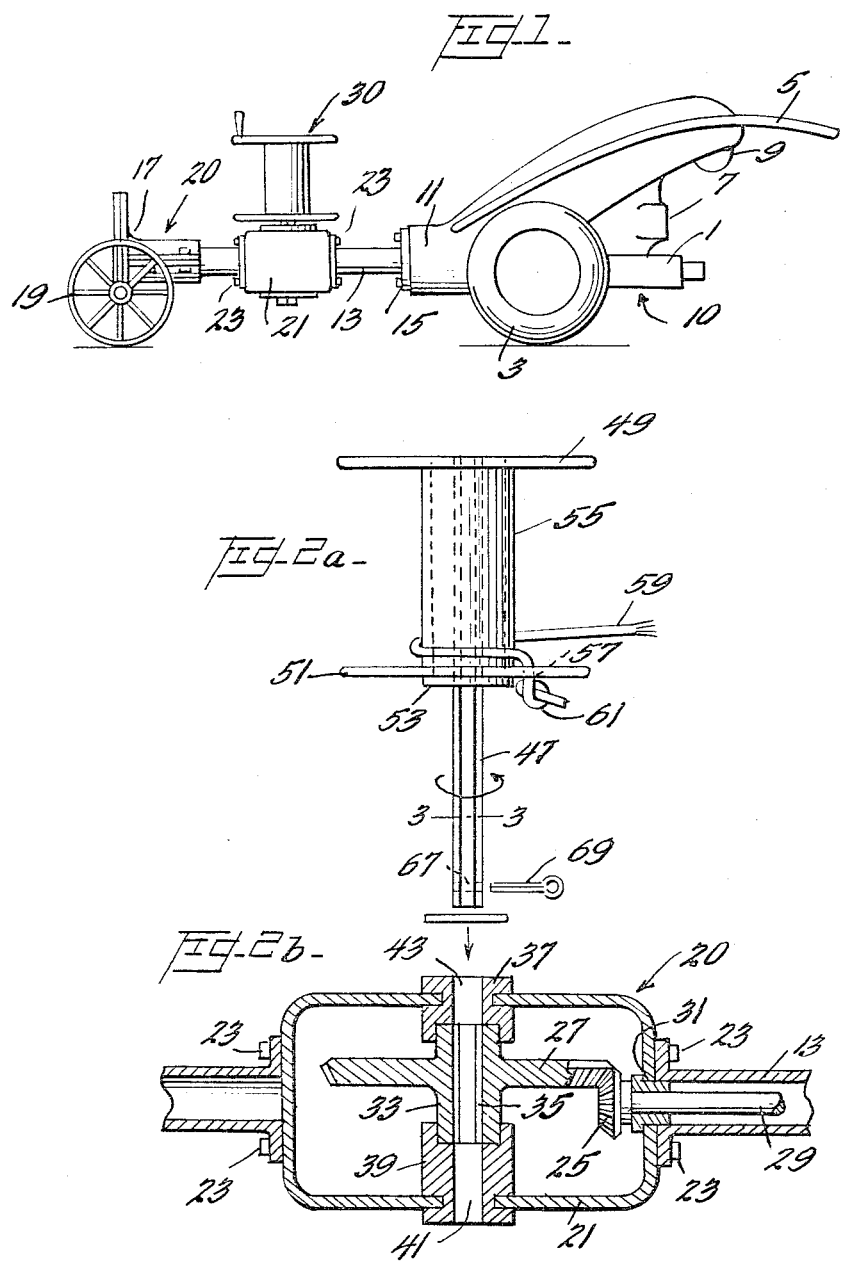
INVENTOR.
John F. Burr,
BY Smith, Michael,
Bradford and Gud
ATTORNEYS

3,313,524
REELING DEVICE
John F. Burr, Rte. 4, Buckhannon, W. Va. 26201
Filed Feb. 23, 1966, Ser. No. 529,389
2 Claims. (Cl. 254—166)

This invention is concerned with a winch attachment for tractors. More particularly, the invention is concerned with a winch arrangement whereby a two wheeled self-powered tractor generally referred to as a garden tractor may be converted to a power winch implement capable of performing a variety of operations such as log snaking, hoisting, moving mired vehicles and the like.

Garden tractors are in wide use today, particularly on small farms same having general utility for plowing, discing and the like. Various and sundry attachments have been developed for use with such tractors and the present invention is intended to provide an arrangement whereby such a tractor may be utilized in endeavors other than strictly for agricultural operations.

Accordingly, it is an object of the invention to provide a garden tractor with more flexible operating capabilities.

Another object of the invention is to convert a typical garden tractor into a portable power winch.

Still a further object of the invention is to provide a winch structure compatible with garden tractors presently available.

These and other objects of the invention not specifically referred to but inherent therein are accomplished by the combination of a self-powered garden tractor having an integral power take-off with an auxiliary frame, said frame having a gear case and means for connecting the gear case to the tractor power take and a reel, said reel being connected to said gear case and driven thereby and comprising a central shaft, a spool member concentric with respect to and surrounding said shaft, a pair of annular flanges mounted on the shaft and engaging the ends of the spool member said flanges and said spool member being disposed adjacent one end of said shaft whereby substantially half of the shaft is unobstructed, the unobstructed end of the shaft being provided with means whereby said reel is fixed on said auxiliary frame.

Having broadly described the invention, the details thereof will be readily apparent as the description proceeds, reference being made to the drawings forming a part thereof and wherein:

FIG. 1 is a side elevational view of the winch attachment and tractor;

FIGS. 2a and 2b are elevational and sectional views showing the reel and transmission attachment thereof; and FIG. 3 is a sectional view taken along the line 3—3 of FIG. 2.

As shown in FIG. 1, the device comprises a two wheeled tractor 10, an auxiliary frame 20 and a reel 30. The tractor, per se, forms no part of the invention being of a type readily available on the market and comprised of a frame 1, supported on driving wheels 3 (only one shown). Also mounted on the frame 1 are a pair of control handles 5 and a prime mover 7 along with a fuel reservoir 9. The frame 1 may comprise a transmission housing containing clutches, gears etc., whereby the wheels may be driven from the prime mover 7 and also whereby a power take-off connection may be provided at the forward or leading end of the tractor. The power take-off need not be described in detail since it is conventional and comprises essentially a driven coupling member engaged with an implement attached to frame 1 so that the implement may also be driven from prime mover 7 either concurrently with or separately from driving forces applied to wheels 3. A prime example of a tractor having such features may be found on the open market, same being manufactured by Gravely Tractors Division of Studebaker Corporation at Dunbar, W. Va.

Attached to the forward portion of frame 1 of tractor 10 is a tubular auxiliary frame assembly 20. This assembly includes a generally central tube element 13 having means at 15 whereby same may be removably fixed to tractor 10. The leading end of central tube element 13 is engaged by a bracket 17, the latter in turn being provided with wheels 19 by any suitable means whereby when frame 20 is attached to tractor 10, the combination produces a four wheeled self-powered vehicle, all as clearly illustrated in FIG. 1.

Located approximately mid-way of the length of the tubular auxiliary frame 20 is a gear case 21 which is integrated into the frame by suitable fastening means 23 so that, in effect, it forms simply an enlargement of tube element 13 at its mid-point.

As shown in FIG. 2, gear casing 21 houses a torque multiplication gear train which may take a variety of forms, but which for simplicity is illustrated simply as a plurality of intermeshed bevel gears 25 and 27 respectively.

Gear 25 is keyed on the end of a drive shaft 29, the latter being carried within tubular frame element 13 and being in turn connected to the aforesaid power take-off arrangement 11 in the conventional tractor 10. The shaft 29 thus rotates about a horizontal axis projecting forwardly of the tractor 10 and may be centered and supported within tubular element 13 by suitable bearing means 31.

As also shown in FIG. 2, bevel gear 25 engages the larger bevel gear 27 which gear includes an enlarged central hub 33 having a central aperture 35. The hub 33 is in engagement with upper and lower bearing members 37, 39 which support same in rotatably fixed position within gear case 21. Bearings 37, 39 are also apertured at 41, 43 the arrangement being such that these apertures are in vertical alignment with aperture 35 in gear hub 33 creating a passage extending completely through the entire gear case. As is further illustrated the apertures 41, 43 are cylindrical interiorly while the aperture 35 in gear hub 33 is somewhat smaller in diametric dimension and further is of a shape other than cylindrical. A preferred configuration for the aperture 35 is hexagonal as shown.

Thus it may be seen that the power output from power take-off 11 is transmitted via shaft 29 to gear 25 and to gear 27 whereby rotary motion is imparted to gear 27, same rotating about a vertical axis passing through aligned apertures 35, 41 and 43.

Drivingly connected to the gear 27 is the reel 30 shown in FIG. 1 and in FIG. 2a disposed above the gear casing 21 ready for installation thereon.

The reel 30 includes an elongated shaft 47 having a hexagonal cross section (see FIG. 3) complementary to that of aperture 35 in the hub 33 of gear 27. At one end the shaft 47 is provided with an annular flange 49 fixed thereto as by welding or the like. A further annular flange 51 is also welded to shaft 47, the latter flange being identical to flange 49 and being positioned on shaft 47 at approximately its mid point. A collar member 53 may also be welded to the lower side (as seen in FIG. 2a) of flange 51 and also to shaft 47. Extending between and fixed to the inner and opposed faces flanges 49 and 51, as by welding or the like, and concentric of and surrounding shaft 47 is a spool 55 of hollow cylindrical form. The outer surface of the spool 55 forms a line or rope pay off member as will be apparent.

It will be noted that flange 51 is provided with an opening 57 whereby the end of line or rope 59 may be passed therethrough and knotted as at 61.

As described the reeling structure occupies about one half the total length of shaft 47 with the result that the remaining or lower half (as shown in FIG. 2a) thereof is unobstructed. Thus this half of shaft 47 may be inserted into the aligned apertures 43, 35 and 41 forming the through passage in gear casing 21 with the result that the complementary shape of the interior of aperture 35 the outside of shaft 47 forms a driving connection whereby the reel 30 may be rotated by gear 27, the collar 53 resting on top of the bearing 37. In order to lock the reel 30 in place to prevent its pulling out the gear case 21 under winding strains, the lower or unobstructed portion of shaft 47 may be diametrically pierced at 67 to receive a removable pin 69 after the shaft is properly positioned in the gear casing 21. A suitable washer 71 may also be provided to prevent wear of bearing 41 by pin 69. To affect this locking the shaft 47 must be of such length that when positioned in gear case 21, its lower end projects downwardly below bearing 41 to permit access to and insertion of pin 69 into opening 67.

From the above description it will be seen that a very useful, portable self powered winding and reeling device is developed from a conventional two wheeled garden tractor. It will also be apparent that various modification changes will occur to those skilled in the art; all being within the spirit and scope of the invention which is limited as defined in the following, wherein.

What is claimed is:

1. For use in combination with a two wheeled, self-powered tractor having a front accessible power take-off; a winding and reeling attachment comprising a ground supported auxiliary frame, said frame having a gear case and gear means within the case driven from the tractor power take-off; said case and said gear means including vertically aligned apertures forming a through passage whereby a shaft may be driven by said gears, the aperture in said gear means being irregularly shaped; a reel device removably mounted on said gear case, said reel device comprising a central shaft having a shape complementary to that of the aperture in said gear and a first flange mounted on one end of the shaft, a second flange mounted on said shaft approximately midway of its length, a spool member concentric with the shaft and extending between and fixed to the spaced flanges defining therewith a reel, the remainder of said shaft from said second flange to its other end being unobstructed and passing completely through the said passage in said gear case and being in engagement with said gear for rotation by said gear about a vertical axis, the unobstructed end of said shaft extending below the gear case whereby same may be removably fastened in place on said attachment, said end of said shaft comprising the sole connection and support between the frame and said reel.

2. A reel device for attachment to a two wheeled garden tractor fitted with an auxiliary wheeled frame said frame being provided with an apertured gear casing and driven gears within the casing, of which one of said gears rotates about a vertical axis and is provided with a central aperture of irregular configuration and aligned with the apertures in said gear casing, said reel device adapted to be mounted on said gear casing and comprising a shaft having a cross sectional configuration complementary to and drivingly engageable with the central aperture in said gear; a first annular flange mounted on said shaft adjacent an end thereof; a second annular flange on said shaft, spaced from said first mentioned annular flange and fixed to said shaft approximately midway of its length; a spool member mounted between and fixed to the opposing inner faces of said annular flanges and concentric with respect to said shaft, the remainder of said shaft, for approximately half its length, being unobstructed and free for insertion into the apertured gear casing and through the central aperture of said gear for driving engagement.

References Cited by the Examiner

UNITED STATES PATENTS

| 1,509,385 | 9/1934 | Whatley | 254—166 |

FOREIGN PATENTS

| 817,831 | 2/1937 | France. |
| 839,384 | 12/1937 | France. |
| 844,097 | 9/1938 | France. |
| 1,089,277 | 9/1960 | Germany. |

EVON C. BLUNK, *Primary Examiner.*

H. C. HORNSBY, *Assistant Examiner.*